United States Patent [19]

Pike

[11] Patent Number: 5,192,852

[45] Date of Patent: Mar. 9, 1993

[54] SUBSTANTIALLY OXYGEN-FREE CONTACT TUBE

[75] Inventor: James F. Pike, Newport News, Va.

[73] Assignee: The United States of America as represented by the Administrator of the National Aeronautics and Space Administration, Washington, D.C.

[21] Appl. No.: 791,728

[22] Filed: Nov. 14, 1991

[51] Int. Cl.⁵ .............................................. B23K 9/24
[52] U.S. Cl. .............................................. 219/137.61
[58] Field of Search ........................ 219/137.2, 137.61

[56] References Cited

FOREIGN PATENT DOCUMENTS

| | | | |
|---|---|---|---|
| 50-59245 | 5/1975 | Japan | 219/137.61 |
| 52-31923 | 3/1977 | Japan | 219/137.61 |
| 52-31924 | 3/1977 | Japan | 219/137.61 |
| 52-31925 | 3/1977 | Japan | 219/137.61 |
| 1123816 | 11/1984 | U.S.S.R. | 219/137.61 |

*Primary Examiner*—Clifford C. Shaw
*Attorney, Agent, or Firm*—Kevin B. Osborne

[57] ABSTRACT

A device for arc welding is provided in which a continuously-fed electrode wire is in electrical contact with a contact tube. The contact tube is improved by using a substantially oxygen-free conductive alloy in order to reduce the amount of electrical erosion.

18 Claims, 1 Drawing Sheet

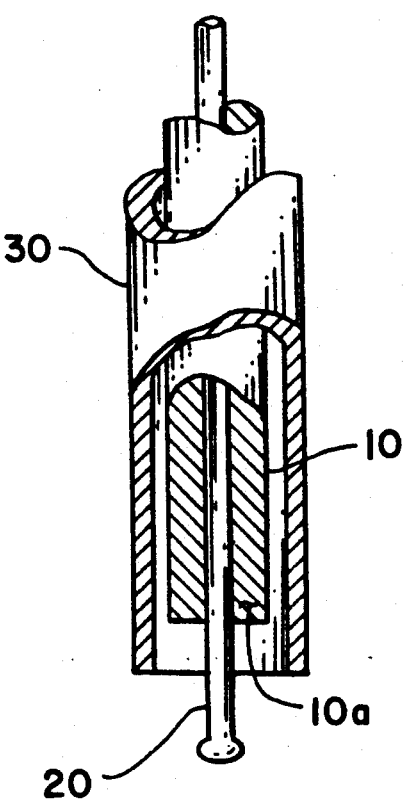

SUBSTANTIALLY OXYGEN-FREE CONTACT TUBE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates generally to arc welding and more specifically to a contact tube improvement to reduce the degree of electrical erosion.

2. Description of the Related Art

Arc welding processes such as gas metal arc welding (GMAW), flux cored arc welding (FCAW) and submerged arc welding (SAW) use continuously-fed consumable electrodes. These electrodes are guided through and maintain contact with a contact tube which also acts to transfer current to the electrode. Because of their function in transferring current, the tubes must have high conductivity and therefore are generally manufactured from copper alloys. Contact tubes are considered an expendable component which must be periodically replaced as a result of abrasive wear and electrical erosion which cause deterioration of the tubes. Because of this deterioration, the welding industry has long sought various means for increasing the useful life of the contact tubes. Although electrical erosion has been identified in the art as a source of deterioration, applicant is unaware of related art identifying the underlying cause of this phenomenon.

SUMMARY OF THE INVENTION

It is a primary object of the present invention to provide a device for transferring current to a continuously-fed consumable electrode which has an increased wear life due to a reduction in electrical erosion. Additional objects and advantages of the present invention are apparent from the specifications and drawings which follow.

The foregoing objects are achieved by manufacturing the contact tube from a substantially oxygen-free copper alloy. Selection of an oxygen-free copper was based on results of metallurgical analyses conducted by the applicant of contact tubes presently used in the art. These analyses revealed high concentrations of oxides in the regions of the contact tubes affected by electrical erosion.

Beneficial results have been obtained by limiting the oxygen content to a maximum of approximately 0.001% by weight. Use of this type of alloy has been shown to increase the wear life of a specific contact tube by approximately 37%.

Contact tubes manufactured with this substantially oxygen-free copper alloy are suited to a variety of arc welding processes such as GMAW, FCAW and SAW which use contact tubes to transfer electrical current to a continuously-fed consumable electrode wire.

BRIEF DESCRIPTION OF THE DRAWING

FIG. 1 is a schematic drawing of a portion of a welding gun containing a contact tube and a continuously-fed electrode wire.

DESCRIPTION OF THE PREFERRED EMBODIMENTS

Referring to FIG. 1, a contact tube 10 is housed within a welding gun nozzle 30. The contact tube 10 acts both to guide a continuously-fed electrode wire 20 and to transfer current to the electrode wire 20. Current is provided by means of a conventional power supply.

Although FIG. 1 depicts a hollow, cylindrical contact tube 10 through which the electrode wire 20 is guided, this is only a illustrative design. The present invention applies to any type and shape of contact tube which maintains contact with the wire in order to transfer current. Any suitable guiding mechanism can also be employed.

Metallographic examination by the applicant of a contact tube 10 made from a conventional copper alloy indicated the occurrence of electrical erosion at the contact tip 10a of the tube. This region of erosion was associated with an increased incidence of oxides. To reduce the oxide occurrence, contact tubes 10 were manufactured from a substantially oxygen-free copper alloy in which the oxygen content was maintained below approximately 0.001% by weight. The reduced oxygen content resulted in an approximately 37% increase in the wear life of contact tubes which were tested. Further decreases in the concentration of oxygen may be used to achieve higher levels of wear life. According to the present invention, substantially reducing the oxygen in any conductive alloy susceptible to electrical erosion due to the formation of oxides should significantly enhance the wear life of the contact tube 10.

Although the present invention has been described in detail with respect to certain preferred embodiments thereof, it is understood by those of skill in the art that variations and modifications in this detail may be made without any departure from the spirit and scope of the present invention, as defined in the hereto-appended claims.

What is claimed is:

1. A device for arc welding, comprising:
   (a) a continuously-fed consumable electrode wire; and
   (b) a contact tube which is in electrical contact with said electrode wire, wherein said tube is comprised of a substantially oxygen-free conductive alloy for reducing electrical erosion of said contact tube.

2. The device according to claim 1, wherein said contact tube guides said electrode wire.

3. The device according to claim 1, wherein said contact tube is comprised of a substantially oxygen-free copper alloy for reducing electrical erosion of said contact tube.

4. The device according to claim 3, wherein said contact tube guides said electrode wire.

5. The device according to claim 1, wherein said contact tube is comprised of a copper alloy containing a maximum of approximately 0.001% oxygen by weight for reducing electrical erosion of said contact tube.

6. The device according to claim 5, wherein said contact tube guides said electrode wire.

7. A device for arc welding, including a continuously-fed consumable electrode wire and a contact tube which is in electrical contact therewith, wherein the improvement comprises:

a substantially oxygen-free conductive alloy forming said contact tube for reducing electrical erosion of said contact tube.

8. The improvement according to claim 7, wherein said contact tube guides said electrode wire.

9. The improvement according to claim 7, wherein said contact tube is comprised of a substantially oxygen-free copper alloy for reducing electrical erosion of said contact tube.

10. The improvement according to claim 9, wherein said contact tube guides said electrode wire.

11. The improvement according to claim 7, wherein said contact tube is comprised of a copper alloy containing a maximum of approximately 0.001% oxygen by weight for reducing electrical erosion of said contact tube.

12. The improvement according to claim 11, wherein said contact tube guides said electrode wire.

13. A contacting member for use in arc welding, wherein a continuously-fed electrode wire is in electrical contact with said contacting member, comprising:

a contact tube for transferring electric current to the electrode, wherein said contact tube is comprised of a substantially oxygen-free conductive alloy for reducing electrical erosion of said contact tube.

14. The contacting member according to claim 13, wherein said contact tube guides said electrode wire.

15. The contacting member according to claim 13, wherein said contact tube is comprised of a substantially oxygen-free copper alloy for reducing electrical erosion of said contact tube.

16. The contacting member according to claim 15, wherein said contact tube guides said electrode wire.

17. The contacting member according to claim 13, wherein said contact tube is comprised of a copper alloy containing a maximum of approximately 0.001% oxygen by weight for reducing electrical erosion of said contact tube.

18. The contacting member according to claim 17, wherein said contact tube guides said electrode wire.

* * * * *